INVENTOR.
WILLIAM W. AVANT
BY
Herschel C. Omohundro
ATTORNEY

United States Patent Office 3,433,251
Patented Mar. 18, 1969

3,433,251
REGULATOR VALVE MECHANISM
William W. Avant, Scottsdale, Ariz., assignor to The Garrett Corporation, Los Angeles, Calif., a corporation of California
Filed Sept. 2, 1966, Ser. No. 577,009
U.S. Cl. 137—488     11 Claims
Int. Cl. F16k 31/12, 31/36

ABSTRACT OF THE DISCLOSURE

The subject valve 10 includes a body 14, having a passage 15 in which a valve element 16 is arranged for pivotal movement, a pressure responsive actuator 13 which is provided to operate the valve, and a coil spring normally holding the valve in closed position. A fluid line 27 extends from the inlet side of the valve to an On-Off valve 13 of the solenoid operated type. When this valve is deenergized it connects a branch line 41, leading from valve 13 to one end of the actuator, with the ambient atmosphere. It also connects another branch line 42, leading from the valve 13 to the other end of the actuator, with line 27. At this time fluid supplied to the inlet of valve 10 may flow through line 27 and branch 42 to the end of the actuator to assist the spring in holding the valve closed. When the solenoid valve is energized it reverses the connections between branches 41 and 42, the latter then being connected with the ambient atmosphere and branch 41 being connected with line 27. At this time fluid supplied to valve 10 may flow through lines 27 and 41 to the actuator to cause it to move valve 16 toward an open position.

Figure 1:
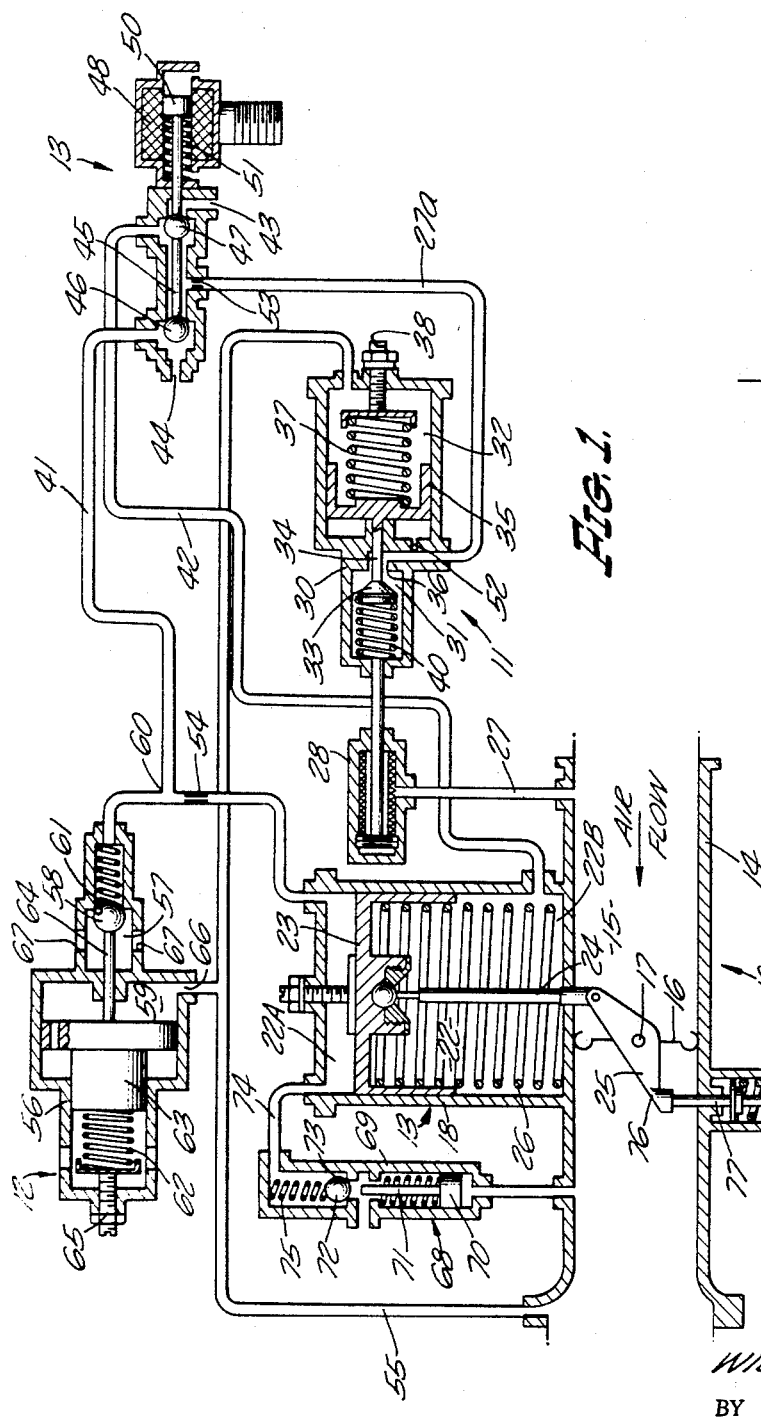

Pilot regulators 11 and 12 are provided to control the operation of valve 16. Regulator 11 is connected in line 27 and has a valve 33 for controlling fluid flow through line 27. It also has an actuator 35, responsive to fluid pressure from line 27, to limit the flow of fluid under pressure through line 27 to the actuator to cause the initial opening movement of valve 16 to be relatively slow. Element 11 also is responsive to fluid under pressure from the outlet side of valve 16 to increase flow through line 27 to accelerate the opening movement of valve 16 after the slower initial movement. Regulator 12 has a valve 58 connected with line 41 and is responsive to fluid pressure in the passage 15, at the outlet side of valve 16, to bleed fluid from line 41 and cause actuator 13 to move valve 16 toward a closed position when outlet pressure reaches a predetermined value to maintain such outlet pressure. A safety mechanism 68 is provided to bleed fluid from the actuator in the event element 12 fails to function to prevent the building up of excessive pressure at the outlet side of valve 16.

---

This invention relates generally to fluid pressure systems such as those used in pressurizing the cabins and effecting the operation of components of aircraft. More particularly, the invention relates to a valve mechanism used to regulate and shutoff pressure in such fluid pressure systems.

An object of this invention is to provide a valve mechanism which will function to control or regulate the pressure in a fluid supply line so that when fluid under pressure is to be applied to a mechanism, such as a turbine-driven engine starter, the pressure of fluid initially admitted will be low to prevent destructive shock from being imparted to the mechanism, but as the mechanism responds the rate of fluid admission will be progressively increased to effect a smooth, rapid acceleration of the mechanism.

More specifically, it is an object of this invention to provide a valve mechanism which will have a main valve with a fluid pressure responsive actuator and a pilot valve to control the application of fluid under pressure to the actuator and consequently the operation thereof, the pilot valve being responsive in part to the fluid pressure at the outlet side of the main valve, thus varying the operation of the main valve in accordance with change in the outlet pressure to secure a predetermined rate of increase in such pressure after a restricted initial admission of fluid under pressure.

Another object of this invention is to provide a valve mechanism of the type mentioned in the preceding paragraph in which the pilot valve is in itself a regulator, known as a bleed-on type, having a resiliently biased, normally open valve arranged in a trunk duct communicating with a fluid pressure supply to control fluid pressure applied through a restricted branch duct to the actuator of the main valve, the normally open pilot valve having an actuator urged toward valve-closing position by the fluid pressure in the trunk duct at the downstream side of the pilot valve, the pilot valve actuator also being urged in a valve-opening direction by fluid pressure at the outlet side of the main valve, the pressure differential and resilient forces applied to the actuator of the pilot valve serving to apply fluid pressure to the main valve actuator to effect a slow initial opening rate followed by an accelerated opening rate.

A further object of the invention is to provide the valve mechanism of the two preceding paragraphs with a servocontrol device having a bleed-off valve communicating with the duct branch leading to the opening side of the main valve actuator, the servocontrol also being responsive to the fluid pressure at the outlet side of the main valve to bleed fluid pressure from the duct branch and thus control the position of the main valve and consequently the pressure in the line downstream thereof.

Figure 2:
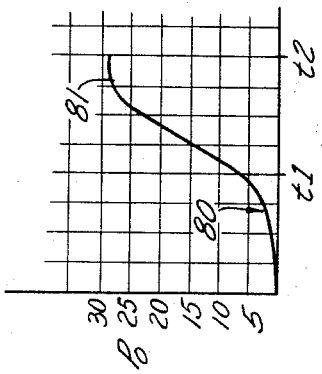

Other objects and advantages of the invention will be made apparent by the following description of one valve mechanism embodying the invention shown schematically in the accompanying drawings, in which:

FIG. 1 is a schematic view partly in section of a pressure differential regulator and shutoff valve formed in accordance with the pressent invention; and FIG. 2 is a graph with a curve to show the outlet pressure versus time performance which may be secured with the mechanism illustrated in FIG. 1.

More particular reference to FIG. 1 of the drawing will show that the valve mechanism forming the subject matter of the invention includes four major parts, designated generally by the numerals 10, 11, 12, and 13, part 10 constituting the valve portion, part 11 being a pilot regulator, part 12 a servo bleed valve, and part 13 an On-Off valve. The valve portion 10 includes a tubular body 14 which forms a fluid flow passage 15. Within this passage there is arranged a main valve 16 which, in this instance, is of the pivoted butterfly type, the shaft on which it is supported for rotation being designated by the numeral 17.

The body 14 is provided with a cylinder 18 forming a piston chamber 22 for the reception of an actuator piston 23. This element 23 is connected by a push rod 24 and lever 25 with the pivot shaft 17 to effect the rotary movement of the butterfly. A spring 26 is disposed between the piston 23 and one end wall of the cylinder to effect movement of the butterfly toward a closed position. The main valve is shown in the latter position in FIG. 1. To effect opening movement of the main valve, fluid under pressure from a suitable source is supplied to the piston chamber at the opposite side of the piston from that engaged by the spring 26. In the form of the valve mechanism illustrated, the source of fluid under pressure is the supply line in which the valve mechanism 10 is positioned.

Fluid is withdrawn from the supply line through a trunk duct 27 communicating with passage 15 in advance of valve 16, and is passed through a filter 28, after which it is admitted to the pilot regulator 11. This element includes a casing 30 having a valve chamber 31 and an actuator piston chamber 32. The valve chamber receives a poppet-type valve 33 disposed on one end of a stem 34 which extends through an opening in a wall of the casing and is connected with an actuator piston 35 disposed for movement in the chamber 32. The trunk duct 27 has an extension 27A which communicates with the valve chamber 31 through the opening for the valve stem and leads from the valve stem opening through one side of the casing, the edge of the valve stem opening adjacent the valve chamber 31 forming a seat 36 for the valve 33. This valve cooperates with the seat 36 to control fluid flow from the valve chamber into the trunk duct extension 27A at the outlet side of the valve 33. The piston chamber 32 receives a spring 37 which normally urges the piston 35 in a valve-opening direction. Suitable means 38 are carried by the casing to vary the force of the spring 37. A small spring 40, disposed in the valve chamber between the end of the casing and valve 33, serves to stabilize the valve by absorbing any lost motion.

Trunk duct extension 27A comunicates with the inlet of On-Off valve 13 used to initiate and interrupt the operation of the valve mechanism. This On-Off valve has a pair of outlets which are connected by duct branches 41 and 42 with the piston chamber 22 at opposite sides of the piston 23. Valve 13 also includes a pair of ports 43 and 44 which communicate with the ambient atmosphere. Within the valve 13 there is provided a stem 45 which carries spaced ball valve elements 46 and 47, these elements being movable between spaced seats by a solenoid 48, the armature 50 of which is connected with the stem 45. A spring 51 normally urges the stem and valves 46 and 47 toward predetermined positions when the coil of the solenoid is deenergized. In such positions, valve 46 will be disposed to permit communication between branch duct 41 and the atmosphere through port 44, and valve 47 will permit communication between branch duct 42 and trunk duct extension 27A. At this time, end 22A of piston chamber 22 will be vented through branch duct 41 and spring 26 may then hold piston 23 in position to maintain valve 16 closed, as illustrated. Also, when the coil of the solenoid is deenergized, branch duct 42 will be in communication with trunk duct 27, so that when fluid under pressure is admitted to the inlet end of passage 15 this fluid may flow through the trunk duct and branch 42 to the end 22B of piston chamber 22 to assist spring 26 in holding piston 23 in main valve-closing position.

It will be noted that casing 30 of the pilot regulator is provided with a port 52 leading from the trunk duct extension 27A at the downstream side of valve 33 to the piston chamber 32 at the side of piston 35 opposite that engaged by spring 37. It will be apparent that when trunk duct 27 is supplied with fluid, some of this fluid will flow through port 52 into piston chamber 32 and apply a force to piston 35 to urge it toward a valve-closing position in opposition to the spring 37. This movement of valve 33 will control the flow of fluid to regulate the pressure in trunk duct extension 27A at the downstream side of valve 33. Such regulator is known as a bleed-on regulator. The pressure secured in this manner may be varied through the adjustment of the force of the spring 37.

It will further be noted that at the point where trunk duct extension 27A communicates with valve 13, an orifice 53 is provided, this orifice serving to limit the flow of fluid to ensure pressure for actuating the piston 35. Branch duct 41 is also provided with an orifice 54, this restriction serving to limit the rate of fluid flow into chamber 22A.

When the operation of valve 16 is to be initiated, the coil of solenoid 48 is energized to move valves 46 and 47 to connect branch 41 with trunk 27 and branch 42 with the atmosphere. At this time, fluid may flow from passage 15 through trunk duct 27 and branch duct 41 to end 22A of chamber 22. This fluid will apply a force to piston 23 to move it in opposition to the force of spring 26. Such movement of piston 23 will cause valve 16 to rotate and permit fluid flow to the downstream or outlet side of the valve. The rate at which fluid may flow into end 22A of chamber 22 will be determined by the force of spring 37 and the size of orifices 53 and 54. Spring 37 is selected to permit valve 33 to move relatively easily to establish a predetermined regulated pressure in trunk duct 27 at the downstream side of valve 33. The pressure selected will obviously have to be sufficient to cause valve 16 to open, but the rate of fluid flow into end 22A of the piston chamber 22 will be insufficient to immediately move such valve to a fully open position.

After valve 16 has initially cracked open, the pressure in passage 15 at the downstream side of valve 16 will start to increase. This pressure is conducted through a line 55 to piston chamber 32 at the side occupied by the spring 37. Fluid at outlet pressure will thus be applied to piston 35 to augment the force of spring 37 to move valve 33 toward an open position. It will be obvious that as downstream pressure increases, the combined forces of spring 37 and fluid pressure will move valve 33 in an opening direction and the regulated fluid pressure in trunk 27 will increase. This increase in pressure will increase the rate of admission of fluid to chamber end 22A, causing piston 23 to increase the rate of movement of valve 16 toward open position. Fluid pressure at the outlet side of this valve will consequently increase, further increasing the rate of opening of regulator valve 33. It will thus be seen that after valve 16 is slowly opened initially, its rate of opening movement will be increased in accordance with the increase in pressure on the outlet side.

Value 16 is utilized to regulate the pressure at the outlet side thereof through the provision of the servo bleed valve 12. This part of the mechanism includes a casing 56, having a valve chamber 57, containing a valve 58, and an actuating piston chamber 59. Valve chamber 57 communicates with branch duct 41, as at 60, through seat 61, which cooperates with valve 58 to bleed fluid from branch duct 41. Casing 56 receives a spring 62 which engages a piston 63 disposed for movement in the piston chamber 59 and connected by stem 64 with valve 58. Spring 62 normally urges valve 58 in a direction to engage seat 61 and prevent fluid flow from branch 41. The force of spring 62 may be varied by adjusting mechanism 65. Piston chamber 59 is connected, as at 66, with line 55 to receive fluid under pressure at the outlet side of valve 16. When this pressure increases sufficiently, piston 63 will be moved in opposition to the force of spring 62 to disengage valve 58 from seat 61. At this time, fluid may bleed from branch duct 41 to the atmosphere through ports 67 leading from valve chamber 57. This escape of fluid will limit the application of fluid under pressure to actuator piston 23, and consequently control opening movement of valve 16. Regulation of fluid pressure in passage 15 at the downstream side of valve 16 is thus secured.

By selection of spring 62 with the proper force relative to the force of spring 37, and the correct calculation of piston areas, orifice sizes, etc., the regulating function of valve mechanism 10 can be delayed until the valve 16 has been slowly opened a distance sufficient to prevent the transmission of shock to any pressure responsive mechanism supplied by the line. When the danger of shock is passed, increasing outlet pressure may be utilized to reset or adjust the pilot regulator for higher valve-opening pressure and a rapid increase of pressure to the selected maximum. When it is desired to interrupt the pressure regulating function of the valve mechanism and utilize the shutoff function, the solenoid 48 may be de-energized. Spring 51 will instantly move valves 46 and 47 back to the positions shown in FIG. 1 and chamber and 22A will be vented to the ambient atmosphere. Chamber 22B will be connected with the fluid pressure source through trunk duct 27 and fluid pressure and spring 26 will move piston 23 in a direction to close valve 16.

In the event the servo should fail to operate for any reason, pressure at the downstream side of valve 16 may be limited by a device, indicated generally by the numeral 68, which constitutes a casing 69 with a piston 70 having a rod 71 projecting therefrom. This rod will engage a ball valve 72 to move it from a seat 73 and establish communication between a passage 74, connected with chamber end 22A, and the atmosphere. When valve 72 is disengaged from its seat, fluid opening pressure will be dissipated from chamber 22A, permitting piston 23 to be moved by spring 26 toward a main valve-closing position. Suitable springs 75 are provided to urge valve 72 and piston 70 toward positions to close the pressure limiting valve 68. This pressure limiting valve is a safety device which under normal conditions will be inactive; it only serves to limit the pressure in the event the servo bleed-off valve 12 fails to function.

The valve mechanism 10 is also provided with a means for indicating whether valve 18 is open or closed. This means includes an extension 76 on the valve operating lever 25, the extension engaging a push rod 77 which in turn actuates a position indicator switch 78. The push rod is spring-pressed toward a position to show when the valve is open. The lever extension 76 moves the position switch to a valve closed position during the final stage of the closing movement of the valve.

From the foregoing it will be obvious that a flow regulator and shutoff valve mechanism has been provided which will secure a slow initial opening movement of the valve followed by a rapid opening movement and pressure regulation. FIG. 2 shows a curve 80 illustrating the outlet pressure versus time performance of the valve mechanism. Curve 80 has a gradual upward progress during the first unit of time, followed by a steep upward trend until the selected maximum or regulated pressure is approached. After the servo bleed-off valve starts to function, the curve levels off, as at 81, and the regulated pressure is then maintained.

I claim:
1. A pressure regulating and shutoff valve, comprising:
   (a) means forming a fluid flow passage;
   (b) valve means disposed in said passage for movement between open and closed positions to control fluid flow through the passage;
   (c) fluid pressure responsive actuator means connected with said valve means to effect the operation thereof;
   (d) a first means for applying fluid pressure from a source to said actuator means to effect the operation of said valve means; and
   (e) a second means responsive to fluid pressure to control the rate of application of fluid pressure by said first means to said actuator, said second means being responsive to fluid pressure from said source to limit the application of fluid pressure to said actuator and cause the initial opening movement of said valve means to be slow, said second means also being responsive in part to fluid pressure in said passage at the outlet side of said valve means to increase the application of fluid pressure to said actuator to accelerate opening movement of said valve means as the outlet pressure increases.

2. A pressure regulating and shutoff valve according to claim 1 in which said second means has a fluid pressure operated valve with an actuator means responsive in part to the differential in pressure existing in said passage on the inlet and outlet sides of said valve means.

3. A pressure regulating and shutoff valve according to claim 1 in which said second means has a fluid pressure operated valve initially responsive to the pressure from said source to restrict the application of fluid pressure to said actuator to move said valve toward open position and subsequently responsive to the differential in pressure existing in the passage on the inlet and outlet sides of said valve means to vary the application of fluid pressure to said actuator to change the rate of movement of said valve toward open position.

4. A pressure regulating and shutoff valve according to claim 1 in which said second means has a bleed-on regulator for controlling the application of fluid pressure to said actuator, and means for applying fluid at the pressure in said passage on the downstream side of said valve means to said bleed-on regulator to vary the operation thereof.

5. A pressure regulating and shutoff valve according to claim 1 in which said second means has a normally open valve for controlling the application of fluid pressure to said actuator, a third means responsive to fluid at the pressure in said passage on the inlet side of said valve means to move said normally open valve toward a closed position, and a fourth means for applying fluid at the pressure in said passage on the outlet side of said valve means to said third means to oppose valve-closing movement thereof.

6. A pressure regulating and shutoff valve according to claim 1 in which said second means has a valve element for controlling the application of fluid pressure to said actuator, resilient means normally urging said valve element toward an open position, a third means responsive to fluid at the pressure in said passage on the inlet side of said valve means to move said valve element toward a closed position in opposition to said resilient means, and a fourth means for applying fluid at the pressure in said passage on the outlet side of said valve means to said third means to oppose valve-closing movement thereof.

7. A pressure regulating and shutoff valve according to claim 1 in which said first means has a duct leading from said fluid flow passage on the inlet side of said valve means to said actuator means, said duct having a restriction in advance of said actuator means, and a bleed-off valve responsive to fluid pressure in said passage at the outlet side of said valve means for bleeding fluid from said duct.

8. A pressure regulating and shutoff valve according to claim 7 in which said second means has a regulator valve in said duct for controlling flow therethrough; resilient means normally urging said regulator valve toward open position; a third means responsive to fluid at the pressure in said passage on the inlet side of said valve means to move said regulator valve toward a closed position in opposition to said resilient means; and a fourth means responsive to fluid at the pressure in said passage on the outlet side of said valve means to resist movement of said regulator valve toward a closed position.

9. A pressure regulating and shutoff valve according to claim 8 in which said third and fourth means comprise a piston connected with the regulator valve, and fluid ducts communicating with said passage on the inlet and outlet sides of said valve means.

10. A pressure regulating and shutoff valve according to claim 1 in which said first means comprises a trunk duct leading from said fluid flow passage at the inlet side of said valve means and communicating with said actuator means via a pair of duct branches and said second means includes a regulator valve arranged in said trunk duct, and in which an On-Off control valve is disposed at the juncture of said trunk and duct branches, said On-Off valve serving to alternately connected said duct branches with said trunk duct and the ambient atmosphere.

11. A pressure regulating and shutoff valve according to claim 10 in which the regulator valve of said second means has an actuating piston, and resilient means normally urging the regulator valve toward open position, said piston being exposed to the pressure in the trunk duct downstream from the regulator valve to move the regulator valve toward closed position in opposition to said resilient means and to the pressure in said fluid flow passage at the outlet side of the valve means in the fluid flow passage to oppose movement of the regulator valve toward closed position.

References Cited

UNITED STATES PATENTS 2,484,557 10/1949 Eckman _____ 137—488
2,918,929 12/1959 Ferguson _____ 137—488 XR

FOREIGN PATENTS 1,105,583 5/1954 France.

M. CARY NELSON, *Primary Examiner.*
R. J. MILLER, *Assistant Examiner.*